(12) United States Patent
Kirschbaum et al.

(10) Patent No.: US 8,493,703 B2
(45) Date of Patent: Jul. 23, 2013

(54) INTEGRATED CIRCUIT ARRANGEMENT FOR SAFETY CRITICAL REGULATION SYSTEMS

(75) Inventors: Andreas Kirschbaum, Darmstadt (DE); Mario Engelmann, Steinbach/Ts. (DE); Frank Michel, Rosbach v.d.Höhe (DE); Luc van Dijk, Roβbach (DE); Wolfgang Fey, Bodolz (DE); Adrian Traskov, Steinbach (DE); Micha Heinz, Darmstadt (DE)

(73) Assignee: Continental Teves AG & Co. oHG (DE)

( * ) Notice: Subject to any disclaimer, the term of this patent is extended or adjusted under 35 U.S.C. 154(b) by 662 days.

(21) Appl. No.: 12/597,369

(22) PCT Filed: Apr. 23, 2008

(86) PCT No.: PCT/EP2008/054905
§ 371 (c)(1),
(2), (4) Date: Jun. 22, 2010

(87) PCT Pub. No.: WO2008/132106
PCT Pub. Date: Nov. 6, 2008

(65) Prior Publication Data
US 2010/0254058 A1    Oct. 7, 2010

(30) Foreign Application Priority Data

Apr. 26, 2007 (DE) .......... 10 2007 020 171
Jun. 2, 2007 (DE) .......... 10 2007 025 827

(51) Int. Cl.
*H02H 5/04* (2006.01)
(52) U.S. Cl.
USPC .......... 361/103

(58) Field of Classification Search
CPC .......... H03K 2017/0806
USPC .......... 361/103
See application file for complete search history.

(56) References Cited

U.S. PATENT DOCUMENTS

| 5,619,430 | A | 4/1997 | Nolan et al. |
| 5,764,541 | A | 6/1998 | Hermann et al. |
| 6,201,997 | B1 * | 3/2001 | Giers .......... 700/79 |
| 6,308,121 | B1 | 10/2001 | Ulm |
| 2004/0037346 | A1 | 2/2004 | Rusu et al. |
| 2007/0041425 | A1 * | 2/2007 | Lee et al. .......... 374/208 |
| 2007/0200432 | A1 * | 8/2007 | Yano et al. .......... 307/44 |
| 2008/0258253 | A1 | 10/2008 | Fey et al. |

FOREIGN PATENT DOCUMENTS

| DE | 19529434 A1 | 2/1997 |
| DE | 19638973 A1 | 4/1998 |
| EP | 496534 A2 | 7/1992 |
| WO | WO95/30200 | 11/1995 |
| WO | WO2005036285 A1 | 4/2005 |

* cited by examiner

Primary Examiner — Rexford Barnie
Assistant Examiner — Tien Mai
(74) Attorney, Agent, or Firm — RatnerPrestia

(57) ABSTRACT

An integrated circuit arrangement on a common chip or chip support, for safety critical applications, in particular for use in control and regulation units for a motor vehicle braking system, including at least one microprocessor system module, which has at least one core processor, provided with at least one ROM and at least one RAM, at least one power module for controlling external users and at least one monitoring module for monitoring at least parts and/or part systems of the circuit arrangement, the circuit arrangement including at least one temperature sensor for recording a chip temperature.

16 Claims, 2 Drawing Sheets

INTEGRATED CIRCUIT ARRANGEMENT FOR SAFETY CRITICAL REGULATION SYSTEMS

CROSS REFERENCE TO RELATED APPLICATIONS

This application is the U.S. national phase application of PCT International Application No. PCT/EP2008/054905, filed Apr. 23, 2008, which claims priority to German Patent Application No. DE102007020171.2, filed Apr. 26, 2007 and German Patent Application No. DE102007025827.7 filed, Jun. 2, 2007, the contents of such applications being incorporated by reference herein.

FIELD OF THE INVENTION

The invention relates to an integrated circuit arrangement.

BACKGROUND OF THE INVENTION

Document DE 195 29 434 A1 describes a microprocessor system with core redundancy for safety-critical regulation applications. This known microprocessor system is provided with two synchronously operated central units on one or more chips which receive the same input information and execute the same program. In this arrangement, the two central units are connected by means of separate bus systems to the read-only memory (ROM) and to the read/write memory (RAM) and also to input and output units. The bus systems are connected to one another by driver stages or bypasses which allow the two central units to jointly read and process the available data, including the test data and commands. The system allows memory space to be saved. Only one of the two central units is (directly) connected to a complete read-only memory and to a read/write memory, while the storage capacity of the second processor is limited to memory locations for test data in connection with a test data generator. Access to all data is obtained by the bypasses. This allows both central units to each execute the full program.

The document WO 2005/036285 A1 proposes an integrated circuit arrangement for motor vehicle braking systems which has a microprocessor system module, a power module for actuating the actuator system and a monitoring module with safety circuits, these modules of the integrated circuit arrangement all being arranged on a shared chip. This integrated circuit arrangement has technical means and design features for electrically decoupling the modules. Possible instances of thermal coupling between the different modules continue to be largely ignored, however.

SUMMARY OF THE INVENTION

An object of the present invention is to propose a circuit arrangement, integrated on a chip or chip carrier, with an integrated microprocessor system module, power module and monitoring module for safety-critical applications which takes account of and/or limits the thermal coupling between the modules or the subsystems.

The invention achieves the object by means of the integrated circuit arrangement.

The invention relates to the idea of equipping an integrated circuit arrangement, which is arranged on a shared chip or chip carrier and comprises both data processing circuits and power circuits, with at least one temperature sensor in order to sense a chip temperature, particularly essentially in a defined region of the integrated circuit arrangement.

The at least one temperature sensor makes it possible to sense when a defined temperature threshold is reached or exceeded in a defined region of the chip. A plurality of temperature sensors arranged at a distance from one another on the chip can be used to sense temperature coupling and/or the propagation of heat energy between modules or subsystems of the integrated circuit arrangement.

Integrating the modules of the Integrated circuit arrangement on a shared chip is less expensive than providing separate chips for the individual modules or for module groups.

A microprocessor system module is preferably understood to mean a core-redundant microprocessor system and/or a microcontroller or a microprocessor system with symmetric redundancy or a microprocessor system with asymmetric redundancy. In particular, the microprocessor system module has two redundant processor cores which have at least one read-only memory and at least one read/write memory respectively or jointly associated with them. With particular preference, the microprocessor system module is designed in line with the microprocessor system described above on the basis of an exemplary embodiment of the document DE 195 29 434 A1. Such embodiments of the microprocessor system module serve to increase the dependability of the circuit arrangement.

The integrated circuit arrangement expediently has two microprocessor system modules which respectively comprise a processor core and a read/write memory. The data processing in these two microprocessor system modules is monitored by two checking devices, in particular, which are respectively connected to the processor cores and to the read/write memories and likewise monitor one another for errors. In this arrangement, one of the microprocessor system modules particularly preferably has no read-only memory of its own, but rather uses the read-only memory of the other module in tandem.

A power module is preferably understood to mean a functional group, comprising actuator drivers and/or a power circuit component for actuating external loads and a power supply unit. In particular, the power module additionally has a watchdog unit and also an analog/digital converter for measuring the supply voltage and particularly preferably for measuring external sensor signals.

The monitoring module is expediently designed to be electrically and thermally more robust than the remaining portion of the integrated circuit arrangement. This is achieved particularly by means of the dimensioning of the electronic components.

Preferably, the monitoring module comprises at least one monitor circuit having shutdown paths at least for external loads and/or actuators.

The arrangement of the integrated circuit arrangement on a chip is preferably understood to mean the joint arrangement of all electronic components of the integrated circuit arrangement on a shared chip carrier.

A subsystem of the integrated circuit arrangement is preferably essentially understood to mean inherently functionally self-contained circuit units and/or programs, particularly individual modules, interface units, power supply units, logic units, power circuits, particularly for actuating external loads, test and/or monitoring circuits and/or microcontroller systems and/or portions of a microcontroller system.

A region essentially between the modules and/or between subsystems is preferably also understood to mean a boundary region for these modules and/or subsystems.

It is expedient that the at least one temperature sensor has at least one associated temperature monitoring unit which can use an evaluation circuit, particularly comprising at least one comparator circuit, and/or an evaluation program to evaluate the temperature data from the one or more sensors and to shut down at least subsystems and/or subregions of the integrated circuit arrangement and/or to put them into an emergency operating mode with restricted functionality and/or to prompt this. This makes it possible to perform controlled, particularly step-by-step shutdown of the integrated circuit arrangement in the event of overheating.

The evaluation circuit of the temperature monitoring unit is designed such that it evaluates the temperature sensor data preferably in line with the temperature characteristic over time and/or with respect to one or more temperature thresholds and/or at least one temperature threshold function.

The temperature monitoring unit preferably has a sensor self-test circuit which tests one or more temperature sensors and particularly the evaluation circuit and/or the evaluation program for correct operation. With particular preference, the sensor self-test circuit is designed such that it distorts the output signal from at least one temperature sensor and/or applies a voltage offset to it and thereby tests the correct operation of the evaluation circuit and/or of the evaluation program. In this case, the sensor self-test circuit is quite particularly preferably actuated and/or is designed such that it performs such a test on the one or more sensors cyclically. With particular preference, the evaluation circuit has at least one comparator for comparing at least one sensor signal with at least one defined reference value which corresponds particularly to a defined limit temperature. This makes it possible to perform software-independent evaluation of the sensor signals. This is relevant particularly when correct operation of the microprocessor system module, for example on the basis of a critical temperature of the microprocessor system module, cannot be guaranteed.

It is expedient that the at least one temperature sensor is present in redundant form, particularly in each case. With that, the output signals from the redundant sensors are compared with one another by the at least one sensor self-test circuit in order to detect possible sensor errors. The redundant temperature sensors are, in particular, alternatively arranged next to one another or in regions of the chip with an essentially similar temperature response, such as at a distance from one another in a boundary region between two modules.

It is expedient that the individual modules of the integrated circuit arrangement each have their electronic components arranged on the chip so as to be essentially not mingled or interdependent or scattered or distributed but rather in essentially compact form as separate regions on the chip. This measure limits the electrical and thermal coupling between the modules.

The individual modules and/or the at least one microprocessor system module, the at least one power module and also the at least one monitoring module are preferably partly or essentially fully electrically decoupled from one another by electrically insulated regions, particularly by doped guard rings and/or etched-in barriers, such as trenches or deep trenches.

The integrated circuit preferably has at least one connection module or crossing module between its modules which connects at least two modules to one another, particularly the microprocessor system module and the power module. This connection module or the connection modules particularly preferably form essentially the only electrical connection between the relevant modules and comprise a defined number of electrical lines and quite particularly preferably buffer elements and/or ESD (Electrostatic Discharge) protection structures which prevent undesirable electrical coupling between the modules, such as when erroneous line spikes occur, via the lines of the connection module and hence protect the respective neighboring module.

The at least one temperature sensor is preferably arranged in a region essentially between two or more modules and/or between individual subsystems on the chip. This makes it possible to sense temperature coupling, particularly between the modules.

It is expedient that at least one temperature sensor is respectively arranged between the microprocessor system module and the power module and the microprocessor system module and the at least one monitoring module. This is advantageous in order to monitor the temperature coupling between these modules. It has been found that a possible critical temperature for the chip appears predominantly on account of an error in the power module and is then initially transferred to the microprocessor system module and thereafter to the at least one monitoring module. The above positioning of the temperature sensors allows the propagation of the heat energy on the chip to be sensed, and certain portions of the circuit arrangement can be shut down in good time as a result. It is additionally possible to perform suitable measures, such as changing over to an emergency mode on account of defined temperature thresholds being sensed to have been exceeded in defined regions of the chip.

The temperature monitoring unit is preferably designed such that upon establishing that a defined temperature for at least one subsystem and/or subregion of the chip has been reached and/or exceeded it can perform and/or prompt at least one of the following measures, particularly using a program:

an error report is created and stored, particularly in a memory in the microprocessor system module and/or in an external memory, subsystems of the integrated circuit arrangement are shut down or put into an emergency operating mode with restricted functionality, particularly on the basis of a defined period for which a defined temperature threshold and/or temperature threshold function is exceeded, at least one external system, particularly external actuators, is shut down, and at least one defined interface unit of the integrated circuit arrangement, particularly a communication interface, is shut down.

The integrated circuit arrangement preferably has two redundant monitoring modules which are arranged particularly essentially in opposite edge regions, quite particularly preferably in different corners, of the chip and/or at a distance from one another. This achieves increased fail safety for the monitoring module.

The at least one monitoring module preferably has a circuit for self-monitoring. In particular, the integrated circuit arrangement has two redundant monitoring modules which respectively comprise a circuit for self-monitoring, these two monitoring modules being connected to one another and being designed such that they can compare their self-monitoring data with one another in order to identify a possible error in a monitoring module. The fact that an error in a monitoring module can be identified increases the reliability of the overall system further, and appropriate measures, such as controlled shutdown of the integrated circuit arrangement, can be prompted in an error situation.

It is expedient that the temperature monitoring unit is part of the monitoring module, because the safety-related monitoring module is responsible for shutting down the integrated circuit arrangement or portions thereof and needs to meet relatively high demands concerning robustness. The temperature monitoring unit is arranged close to the shutdown paths of the monitoring module on the chip, particularly in order to improve reliability at critical temperatures.

The at least one monitoring module preferably has an independent power supply device, which allows a further improvement in the fail safety of the module. In particular, the power supply device of the monitoring module is connected essentially directly to an external power source.

The monitoring module is expediently arranged on the chip such that there are no power circuits, particularly no power circuits of the power module, at least in the direct, adjacent surroundings. In particular, the one monitoring module or the plurality of monitoring modules is/are physically separate from the at least one power module on the chip by virtue of the microprocessor system module and furthermore essentially thermally and electrically decoupled from one another. This is advantageous, since the power module is essentially the module which has the greatest interference or error potentials both thermally and electrically, and the functionality of the monitoring module in an interference or error situation needs to be maintained for as long as possible so that external actuators and the power supply for the chip can be reliably shut down. The at least one monitoring module and the at least one power module are particularly preferably arranged on edge regions of the chip which are essentially opposite one another.

Regions essentially between the modules and/or the subsystems of the circuit arrangement preferably contain no power circuits. This measure allows electrical and thermal coupling between the modules to be kept relatively low. In addition, there intermediate regions therefore essentially have no relevant sources of interference.

The integrated circuit arrangement is expediently connected to an external power supply shutdown device such that the at least one temperature monitoring unit and/or the at least one monitoring module and/or the microprocessor system module can use at least one emergency shutdown path to prompt an interruption in the power supply for at least portions of the integrated circuit arrangement and/or modules and/or subsystems of the circuit arrangement by the external power supply shutdown unit. The integrated circuit arrangement is particularly designed such that if a critical temperature and/or a programmed/programmable, functional temperature threshold is identified by means of at least one temperature sensor as having been exceeded, which particularly preferably takes account of the period for which the temperature is exceeded, then the power supply for at least the power module and the microprocessor system module is interrupted by the monitoring module. In the event of a plurality of monitoring modules being arranged on the chip, the emergency shutdown paths of said monitoring modules are ORed for this. These measures ensure that automatic shutdown of the integrated circuit arrangement, particularly in order to protect against its own destruction, is assured. Switching on the power supply for the circuit arrangement again using the power supply shutdown device is particularly preferably possible after a relatively comprehensive self-test on the overall system, which means that it is possible to recorrect erroneous emergency shutdown. Quite particularly preferably, the power supply for the one or more monitoring modules continues to be assured by an independent power supply device even after an emergency shutdown by the external power supply shutdown device. This ensures that the power supply shutdown device always continues to be actuated with a defined signal from the emergency shutdown path even in the event of a critical condition for the integrated circuit arrangement. It is therefore possible to essentially prevent the power supply shutdown device from switching on again undesirably as a result of an interference effect.

The integrated circuit arrangement preferably forms a system-on-chip, particularly a single-chip EBS system, that is to say, by way of example, a circuit arrangement for an electronic braking system which merely has an error-redundant, large-scale integration circuit internally protected against errors and external interfering influences. The integrated circuit arrangement is therefore particularly preferably implemented essentially fully on a piece of a semiconductor substrate (e.g. silicon). This makes it possible to avoid the otherwise frequently usual isolation of power electronics and large-scale integrated circuits.

The invention also relates to the use of at least one integrated circuit arrangement in motor vehicles, particularly in a motor vehicle regulation system.

As an alternative preference, it is proposed that the two monitoring modules be arranged as integrated circuits on a separate, additional chip. This means that the temperature sensors between the monitoring modules and the microprocessor system module can be dispensed with. However, it is alternatively also possible for the same sensors to remain by way of example.

The integrated circuit arrangement according to aspects of the invention is provided for use in the areas of vehicle engineering, preferably motor vehicle engineering, automation engineering and control engineering. In particular, the integrated circuit arrangement is provided for safety-critical applications, particularly preferably those having fail-safe and/or fail-silent requirements. Quite particularly preferably, the integrated circuit arrangement is provided for use in the area of motor vehicles for electronic braking and regulation systems and airbag controllers.

BRIEF DESCRIPTION OF THE DRAWINGS

Further preferred embodiments can be found in the subsequent descriptions of exemplary embodiments with reference to figures, in which.

DETAILED DESCRIPTION OF THE PREFERRED EMBODIMENTS

Figure 1:
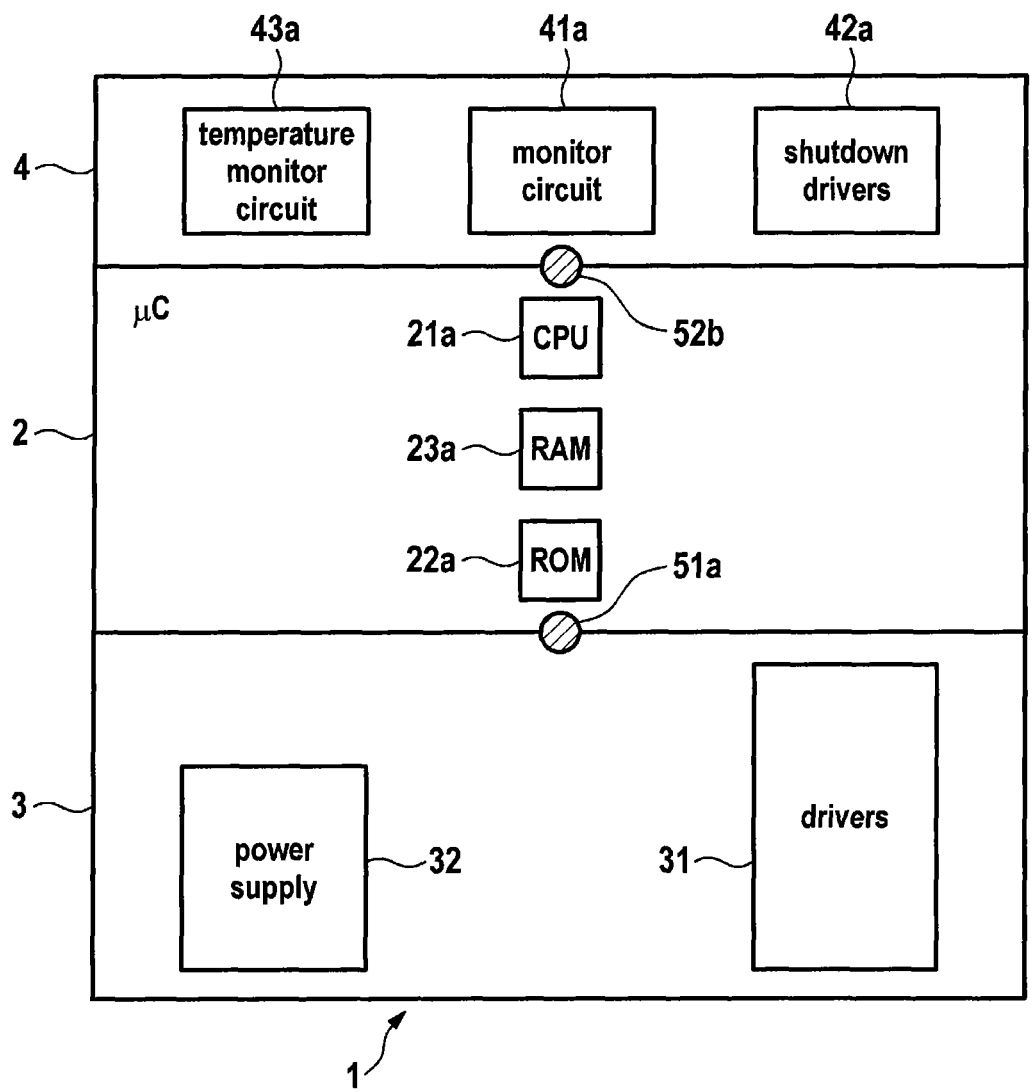
FIG. 1 schematically shows a circuit arrangement example with a processor core, and FIG. 2 schematically shows an exemplary, core-redundant circuit arrangement with redundant monitoring modules.

FIG. 1 illustrates an exemplary integrated circuit arrangement 1. Said circuit arrangement comprises three modules, namely a microprocessor system module 2, a power module 3 and a monitoring module 4, which are all arranged on a shared chip with schematically illustrated positioning and reciprocal delimitation with respect to one another. Arranged between or on the boundary between the microprocessor system module 2 and the power module 1 there is a temperature sensor 51a, and arranged between the microprocessor system module 2 and the monitoring module 4 there is a temperature sensor 52a. These temperature sensors are used to sense the temperatures of the respective region of the chip and also the thermal coupling between the chip modules, and these are evaluated in the temperature monitoring unit 43a (temperature monitor circuit). Microprocessor system module 2 comprises processor core 21a, read-only memory 22a and read/write memory 23a. Power module 3 comprises power circuits 31 for actuating external loads and power supply unit 32.

Figure 2:
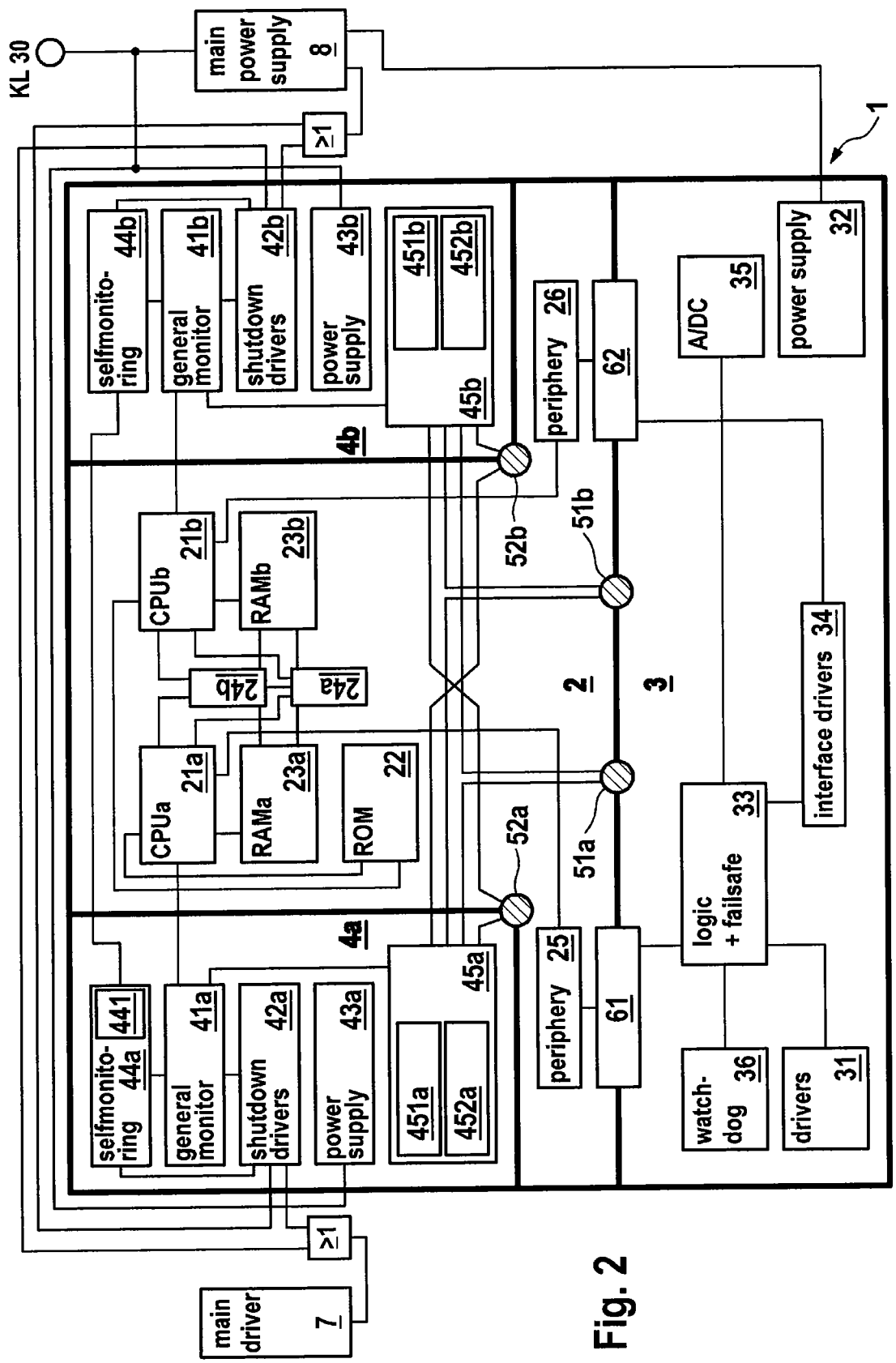

FIG. 2 shows an exemplary embodiment of integrated circuit arrangement 1, which is in the form of a single-chip control unit in an electronic motor vehicle braking system. Circuit arrangement 1 comprises microprocessor system module 2, power module 3, two redundant monitoring modules 4a, 4b and two connection modules 61 and 62 for the electrical connection between microprocessor system module 2 and power module 3. All the electrical connecting lines between microprocessor system module 2 and power module 3 run through the connection modules 61 and 62, said connection modules comprising buffer circuits in order to keep down electrical interfering influences between power module 3 and microprocessor system module 2 as much as possible. In addition, by way of example, these two modules 2 and 3, and likewise microprocessor system module 2 and the two monitoring modules 4a, 4b, have respective electrically insulated regions formed between them in the form of etched-in isolating structures (trenches or deep trenches). These insulated regions have temperature sensors 52a, 52b, 51a, 51b arranged in them in each case between module 2 and 4a, 4b and module 2 and 3.

Microprocessor system module 2 has two redundant processor cores 21a and 21b which have a shared read-only memory (ROM) 22 and a respective read/write memory 23a, 23b associated with them. Processor cores 21a, 21b and read/write memories 23a, 23b are all connected to one another by means of two checking devices 24a, 24b which compare the output data from the two processor cores 21a, 21b and certain memory contents from the read/write memories 23a, 23b and also allow data transmission. The checking devices 24a, 24b are likewise connected to one another and compare their test data and as a result also check their own freedom from error. The processor cores 21a, 21b are furthermore respectively connected to an interface circuit 25 and 26, said interface circuits being connected to connection modules 61 or 62 for the purpose of communication with power module 3. Furthermore, 21a, 21b are respectively connected to a monitor unit 41a, 41b and/or to the monitor circuit of the respective monitoring module 4a, 4b.

Power module 3 has a logic unit with integrated operation monitoring unit 33 which is connected to connection module 61, to a watchdog component 36 which observes subsystems of the power module 3, to a power circuit component 31 for actuating external loads, for example for actuating hydraulic valves, and to an interface unit 34. This interface unit 34 has driver stages and defined bus interfaces for connecting external systems. The configuration of such a bus interface is performed by logic unit 33, the bus lines being connected essentially directly to connection module 62, for example. Furthermore, power module 3 comprises an analog/digital converter 35 and a power supply unit 32 which supplies power to all the components of power module 3 in a manner which is not shown.

The temperature sensors 51a, 51b, 52a, 52b are respectively connected to temperature monitoring unit 45a and 45b of the two redundant monitoring modules 4a and 4b. Temperature monitoring units 45a and 45b respectively comprise an evaluation circuit 451a and 451b and also a sensor self-test circuit 452a and 452b. In this case, the sensor signals from the temperature sensors 51a, 51b, 52a, 52b are respectively evaluated by evaluation circuit 451a and 451b, and a check is performed to determine whether defined temperature thresholds are being reached or exceeded. The evaluated temperature data are transmitted to the respective monitor unit 41a, 41b. The respective sensor self-test circuit 452a, 452b cyclically checks the correct operation of the temperature sensors 52a, 52b, 51a, 51b and of the evaluation circuit 451a, 451b autonomously. To this end, the temperature sensor output signals are distorted. Furthermore, each monitoring module 4a, 4b has an independent power supply device 43a, 43b, these power supply devices 43a and 43b also supplying power to the temperature sensors 52a, 52b, 51a, 51b, for example. In the exemplary embodiment shown for the circuit arrangement 1, these two power supply devices 43a and 43b are connected essentially directly to the electrical potential of the terminal 30. Monitoring modules 4a and 4b furthermore respectively comprise a shutdown driver circuit 42a and 42b, said shutdown driver circuits respectively being jointly connected by means of an "OR" gate both to an external valve main switch 7 (main driver) for shutting down the hydraulic valves and to an external power supply shutdown device 8 (main power supply) and being able to actuate these two external driver stages 7 and 8. Shutdown driver circuits 42a, 42b are for their part respectively actuated by the monitor unit 41a, 41b and additionally in each case by a circuit for self-monitoring 44a and 44b of the respective monitoring module 4a, 4b. In this case, self-monitoring circuit 44a has a self-monitoring checking device 441 which is in the form such that the two interconnected self-monitoring circuits 44a and 44b of the two monitoring modules 4a, 4b can compare their self-monitoring data with one another in order to establish a possible malfunction of a monitoring module 4a, 4b. Self-monitoring circuits 44a and 44b are likewise connected to the respective monitoring unit 41a, 41b. Temperature monitoring units 45a and 45b are respectively designed such that upon establishing that a defined first temperature threshold has been exceeded they shut down power module 3 and the external valves, for example. If a defined second temperature threshold is exceeded, microprocessor system module 2 is additionally shut down. In addition, a respective error report is created and is stored in an external memory. If a critical temperature is sensed above a third temperature threshold by means of at least one of the temperature sensors 52a, 52b, which are arranged between the microprocessor system module 2 and the respective monitoring module 4a and 4b, at least one shutdown driver circuit 42a, 42b actuates external power supply shutdown device 8 (main power supply) such that the power supply for the power module 3 and the microprocessor system module 2 is fully interrupted and an erroneously actuated power supply unit 32 of the power module 3 is also no longer able to provide power. At a temperature above the third temperature threshold, it is no longer possible to completely rule out circuit arrangement 1 being destroyed by the heat energy. The supply of power from the independent power supply devices 43a and 43b of both monitoring modules 4a, 4b is not affected thereby so that it is possible to ensure that power supply shutdown device 8 is always actuated correctly even in the critical state and power supply shutdown device 8 does not automatically switch on again on account of an error or is not incorrectly switched on again from another quarter. If the power supply shutdown device 8 has been erroneously interrupted or shut down, for example because a temperature sensor 51a, 51b, 52a, 52b and/or a temperature monitoring unit 45a, 45b came to an incorrect result, or if the temperature of the chip falls below a defined temperature threshold again, integrated circuit arrangement 1 can be switched on again and started up. To this end, the self-monitoring circuits 44a and 44b of the monitoring modules 4a, 4b prompt a comprehensive self-diagnosis.

The invention claimed is:

1. An integrated circuit arrangement, arranged on a shared chip or chip carrier, for safety-critical applications as a control and regulation unit in a motor vehicle braking system, comprising:
   at least one microprocessor system module which has at least one processor core with which at least one read-only memory and at least one read/write memory are associated, the at least one microprocessor system module powered by a main power supply, at least one power module for actuating external loads, the at least one power module powered by the main power supply, and at least one monitoring module for monitoring at least one of the microprocessor and memory of the circuit arrangement, the at least one monitoring module powered by a secondary power supply independent from the main power supply, wherein the integrated circuit arrangement has at least one temperature sensor for sensing a chip temperature.

2. The circuit arrangement as claimed in claim 1, wherein the microprocessor system module has two redundant processor cores with which both at least one read-only memory and at least one read/write memory are respectively or jointly associated.

3. The circuit arrangement as claimed in claim 1, wherein the at least one temperature sensor has at least one associated temperature monitoring unit which can use an evaluation circuit, an evaluation program, or both an evaluation circuit and an evaluation program to evaluate temperature data for the at least one temperature sensor and can shut down subsystems of the circuit arrangement and/or put them into an emergency operating mode with restricted functionality.

4. The circuit arrangement as claimed in at least claim 3, wherein the temperature monitoring unit has a sensor self-test circuit which tests one or more temperature sensors and the evaluation circuit and/or the evaluation program for correct operation.

5. The circuit arrangement as claimed in at least claim 1, wherein at least one temperature sensor is arranged on the chip in a region between two or more modules.

6. The circuit arrangement as claimed in claim 5, wherein at least one temperature sensor is respectively arranged between the microprocessor system module and the power module, and at least one other temperature sensor is respectively arranged between the microprocessor system module and the at least one monitoring module.

7. The circuit arrangement as claimed in claim 3, wherein the temperature monitoring unit is configured such that upon establishing that a defined temperature threshold for at least one subsystem and/or subregion of the chip has been reached and/or exceeded it can perform and/or prompt at least one of the following measures using a program:

create or store an error report, shut down subsystems of the circuit arrangement or put subsystems of the circuit arrangement into an emergency operating mode with restricted functionality, shut down at least one external system, and shut down at least one defined interface unit of the circuit arrangement.

8. The circuit arrangement as claimed in claim 7, wherein the temperature monitoring unit is configured to shut down subsystems of the circuit arrangement or put subsystems of the circuit arrangement into an emergency operating mode with restricted functionality on the basis of a defined period for which a defined temperature threshold and/or temperature threshold function is exceeded.

9. The circuit arrangement as claimed in claim 1 further comprising two redundant monitoring modules which are arranged on opposite edge regions of the chip and/or at a distance from one another.

10. The circuit arrangement as claimed in claim 3, wherein the temperature monitoring unit is part of the monitoring module.

11. The circuit arrangement as claimed in claim 1, wherein the at least one monitoring module has an independent power supply device.

12. The circuit arrangement as claimed in claim 1, wherein the at least one monitoring module is arranged on the chip such that a power supply of the power module, is not adjacent to the at least one monitoring module.

13. The circuit arrangement as claimed in claim 1, wherein the at least one monitoring module and the at least one power module are arranged on edge regions of the chip which are essentially opposite one another.

14. The circuit arrangement as claimed in claim 1, wherein the microprocessor system module of the circuit arrangement contains no power circuits.

15. The circuit arrangement as claimed in claim 3, wherein the circuit arrangement is connected to an external power supply shutdown device by at least one emergency shutdown path, and the temperature monitoring unit and/or at least one monitoring module can use at least one emergency shutdown path to prompt an interruption in a power supply for at least portions of the integrated circuit arrangement by the external power supply shutdown device.

16. The use of at least one integrated circuit arrangement as claimed in claim 1 in a motor vehicle regulation system.

* * * * *